D. M. BUTLER.
TIRE BRACKET.
APPLICATION FILED DEC. 18, 1915.

1,240,667.

Patented Sept. 18, 1917

Inventor
D. M. Butler
By Victor J. Evans
Attorney

Witnesses
A. E. Newkirk

UNITED STATES PATENT OFFICE.

DAVID MARION BUTLER, OF AUGUSTA, GEORGIA.

TIRE-BRACKET.

1,240,667.  Specification of Letters Patent.  Patented Sept. 18, 1917.

Application filed December 18, 1915. Serial No. 67,635.

*To all whom it may concern:*

Be it known that I, DAVID MARION BUTLER, a citizen of the United States, residing at Augusta, in the county of Richmond and State of Georgia, have invented new and useful Improvements in Tire-Brackets, of which the following is a specification.

This invention contemplates the provision of a tire bracket designed and primarily intended to be associated with a tire carrying rim which generally supports an extra tire on the body of the vehicle, the invention thus providing a satisfactory bracket for a second spare tire.

The nature and advantages of the invention will be better understood from the following description when taken in connection with the accompanying drawing, wherein like numerals of reference indicate similar parts in the several views, and in which:—

Figure 1:
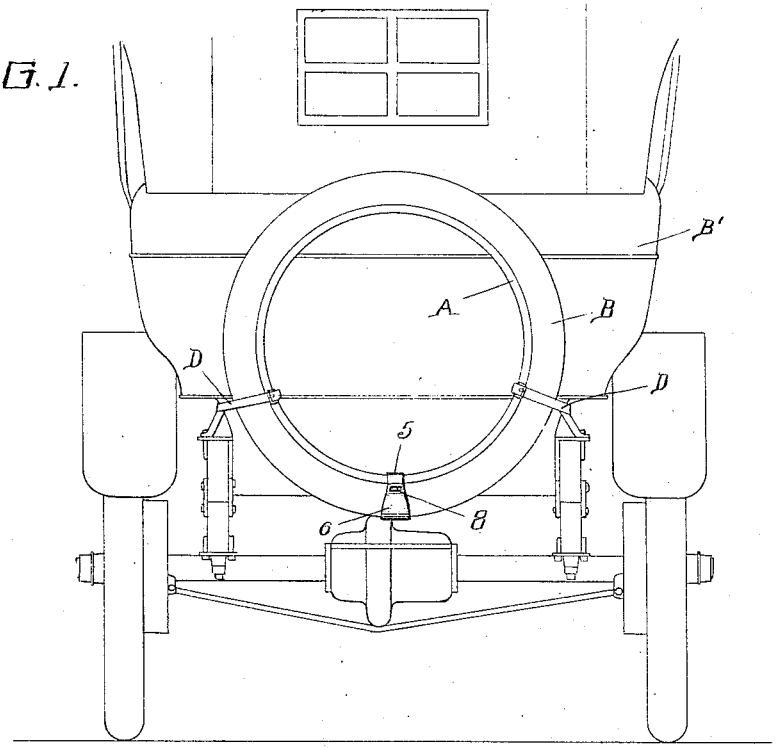
Figure 1 is a rear elevation of a machine showing the manner of associating my improved bracket with the ordinary tire carrying rim.
Figure 2:
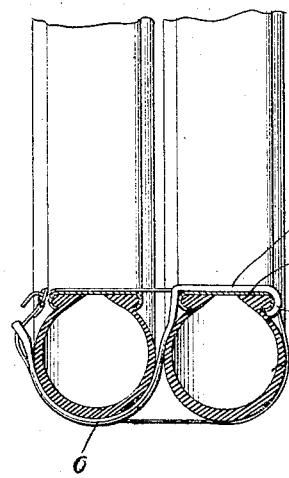
Fig. 2 is an enlarged detail sectional view showing the relative arrangement of parts.
Figure 3:
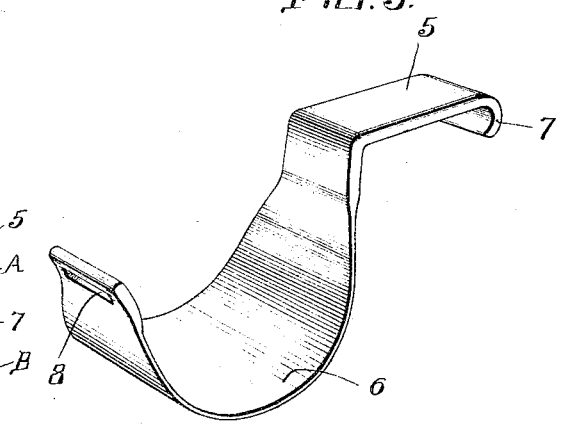
Fig. 3 is a perspective view of the bracket.

Referring more particularly to the drawing A indicates a demountable rim which may be of any construction, and which supports an extra tire indicated at B. The rim together with the tire may be secured in any of the well known ways upon the vehicle B'.

Before entering into a detail description of the device forming the subject matter of my invention herein illustrated, I desire to have it understood that I do not limit myself to this precise construction, the same being merely illustrative of one embodiment of the invention and that various changes in the construction and arrangement may be resorted to when desired as fall within the scope of the appended claims.

As above stated the bracket is primarily designed for use in connection with the tire carrying rim A, and as shown in this specific instance consists of the shank 5 and tire receiving portion 6. The shank is adapted to rest upon the inner periphery of the rim A, and preferably terminates in a hook 7 to engage beneath the rim for the purpose of maintaining the bracket associated therewith. The tire receiving portion 6 may be of any suitable design, but as shown in this instance is curved to conform to the shape of the tire which it is adapted to support, and is furthermore offset with relation to the shank 5, whereby that part of the tire receiving portion adjacent its connection with the shank 5 coöperates with the hook 7 to provide an effective clamp to embrace the opposite sides of the rim A as clearly illustrated. It might here be stated that the brackets in addition to being constructed from any suitable material may be made in different sizes to accommodate tires of different size, while the shank 5 may also vary in length to accommodate itself to rims of different widths. The tire receiving portion 6 is provided adjacent its free end with an elongated slot 8 through which a suitable fastening element, preferably a strap or the like may be passed and wrapped around both of the tires as shown or in any other desired manner. When wrapped around both of the tires, the strap provides an additional means for preventing loss of the second spare tire, as it holds this tire fixed relatively to the tire mounted upon the rim A, which latter is effectively secured by means of the clamps D to the body of the vehicle. It is of course to be understood that some vehicles are provided with a fixed rim not herein shown, but upon which a detachable rim together with a tire as a unit is mounted. In this instance my auxiliary bracket instead of being associated with the tire carrying rim is mounted upon the permanent fixture of the machine or in other words the false rim identically in the same manner as herein illustrated when used in connection with the detachable rim. The bracket is not only simple in construction, thereby reducing the cost of manufacture of such article to a minimum, but is so designed as to permit of its ready association with or removal from the rim A as the occasion may demand.

What is claimed is:—

1. As a new article of manufacture, a tire bracket comprising a shank adapted to engage a tire carrying rim and carried thereby, and a tire receiving portion offset with relation to said shank and having a slot adjacent the free end thereof.

2. As a new article of manufacture, a tire bracket comprising a shank adapted to rest upon a tire carrying rim and carried thereby, a hook on the free end of the shank for engagement with said rim, a tire receiving portion offset relatively to said shank and coöperating with said hook to clamp the bracket upon said rim.

3. As a new article of manufacture, a tire bracket comprising a tire receiving portion having a transverse slot adjacent one end thereof, an integral shank offset relatively to said tire receiving portion, and a hook formed by the free end of said shank.

4. As a new article of manufacture, an auxiliary tire bracket including a shank adapted to be carried by a tire carrying rim, and a tire receiving portion offset relatively thereto and depending therefrom.

In testimony whereof I affix my signature in presence of two witnesses.

DAVID MARION BUTLER.

Witnesses:
JAS. G. BAILIE,
J. C. MAGARAHAN.